(12) United States Patent
Conrads et al.

(10) Patent No.: US 9,599,340 B2
(45) Date of Patent: Mar. 21, 2017

(54) DEVICE AND METHOD FOR CONTROLLING THE FUEL-AIR RATIO IN THE COMBUSTION OF GROUND COAL IN A FIRING SYSTEM OF A COAL-FIRED POWER STATION

(75) Inventors: Hans Georg Conrads, Hannover (DE); Alexander Halm, Hohenwarthe (DE); Martin Bohm, Magdeburg (DE)

(73) Assignee: PROMECON Prozess-Und Messtechnik Conrads GmbH, Barleben (DE)

( * ) Notice: Subject to any disclaimer, the term of this patent is extended or adjusted under 35 U.S.C. 154(b) by 563 days.

(21) Appl. No.: 14/130,626

(22) PCT Filed: Jul. 11, 2012

(86) PCT No.: PCT/DE2012/000696
§ 371 (c)(1),
(2), (4) Date: Jan. 10, 2014

(87) PCT Pub. No.: WO2013/007239
PCT Pub. Date: Jan. 17, 2013

(65) Prior Publication Data
US 2014/0130723 A1  May 15, 2014

(30) Foreign Application Priority Data
Jul. 13, 2011 (DE) .......... 10 2011 107 195

(51) Int. Cl.
*F23N 1/02* (2006.01)
*G01F 1/74* (2006.01)
(Continued)

(52) U.S. Cl.
CPC ............ *F23N 1/022* (2013.01); *F23K 3/02* (2013.01); *F23N 5/184* (2013.01); *G01F 1/64* (2013.01);
(Continued)

(58) Field of Classification Search
CPC ... G01F 1/58; G01F 1/584; G01F 1/64; G01F 1/74; G01F 1/76
See application file for complete search history.

(56) References Cited

U.S. PATENT DOCUMENTS 4,173,888 A * 11/1979 Suzuki ............... G01F 1/64
73/861.05
4,335,616 A * 6/1982 Oliva ............... G01F 1/704
73/861.95
(Continued)

FOREIGN PATENT DOCUMENTS

WO   03056316 A1   7/2003

OTHER PUBLICATIONS

Intern. Prelim. Report on Patentability of PCT/DE2012/000696 (Ch. II of PCT),Translation, undated (estimated Date Jan. 2014).
(Continued)

*Primary Examiner* — David J Laux
(74) *Attorney, Agent, or Firm* — Cohen & Hildebrand, PLLC

(57) ABSTRACT

Coal-fired power station with controller for air-fuel ratio in combustion of ground coal, with pneumatic conveying of ground coal to burners of power station. An electrode (10) with average radius $r_m$ with 0.1 mm$\leq r_m \leq$1.2 mm arranged in channel carrying air in flow direction of air upstream of sensors (11) of correlation measurement device (12) at distance l with 1× unobstructed width of flow cross-section of the channel carrying the air<l<10× unobstructed width of the flow cross-section of the channel carrying the air in the region of the sensors (11). A counter electrode (13, 25) electrically operative relative to electrode (10) is arranged in upstream of sensors (11), and electrode (10) and counter electrode (13, 25) are connected with different poles of a high-voltage source (9) configured for providing a voltage U of 12 kV$\leq$U$\leq$20 kV.

14 Claims, 5 Drawing Sheets

(51) Int. Cl.
*F23K 3/02* (2006.01)
*F23N 5/18* (2006.01)
*G01F 1/64* (2006.01)
*G01F 1/712* (2006.01)

(52) U.S. Cl.
CPC ............... *G01F 1/712* (2013.01); *G01F 1/74* (2013.01); *F23K 2203/104* (2013.01); *F23N 2005/181* (2013.01); *Y02T 50/677* (2013.01)

(56) References Cited

U.S. PATENT DOCUMENTS

| | | | |
|---|---|---|---|
| 4,509,366 A | 4/1985 | Matsushita et al. | |
| 4,512,200 A | 4/1985 | Ghering et al. | |
| 5,022,274 A | 6/1991 | Klinzing et al. | |
| 5,367,911 A * | 11/1994 | Jewell | E21B 47/101 73/861.08 |
| 5,459,406 A * | 10/1995 | Louge | G01F 1/64 324/688 |
| 5,837,902 A * | 11/1998 | Veneruso | G01F 1/64 73/861.06 |
| 6,031,378 A | 2/2000 | Rosin | |
| 2003/0117149 A1 | 6/2003 | Conrads | |
| 2009/0044634 A1* | 2/2009 | Weilguny | G01F 1/64 73/861.09 |
| 2011/0100271 A1* | 5/2011 | Conrads | F23K 1/00 110/186 |

OTHER PUBLICATIONS

ISR issued by EP Patent Offcie of PCT DE 2012/000696, mailed Dec. 6, 2012 (3 pages).

* cited by examiner

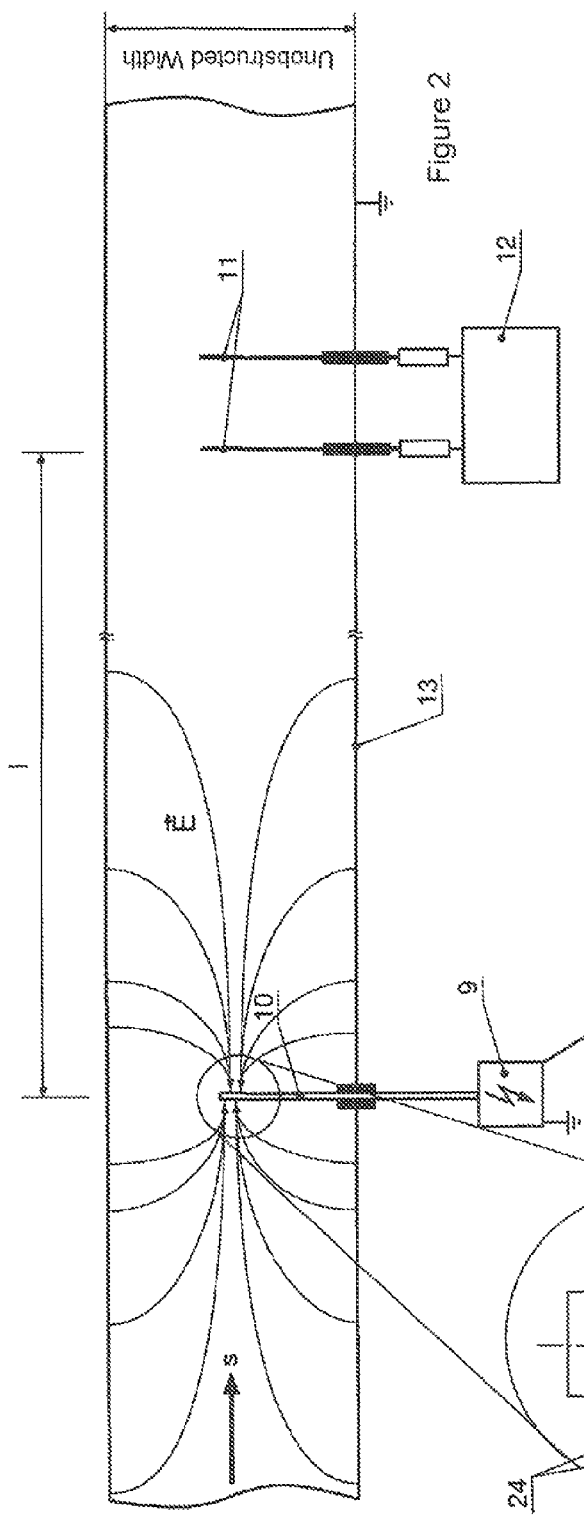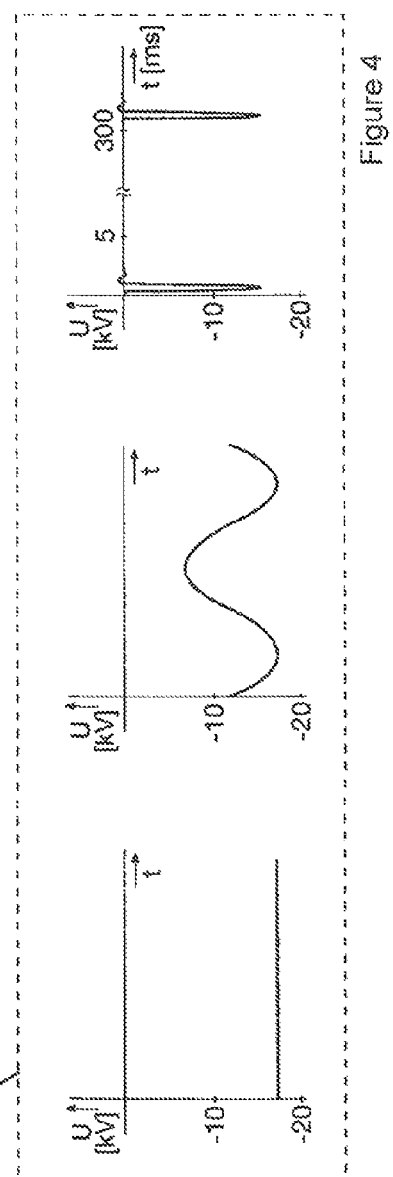

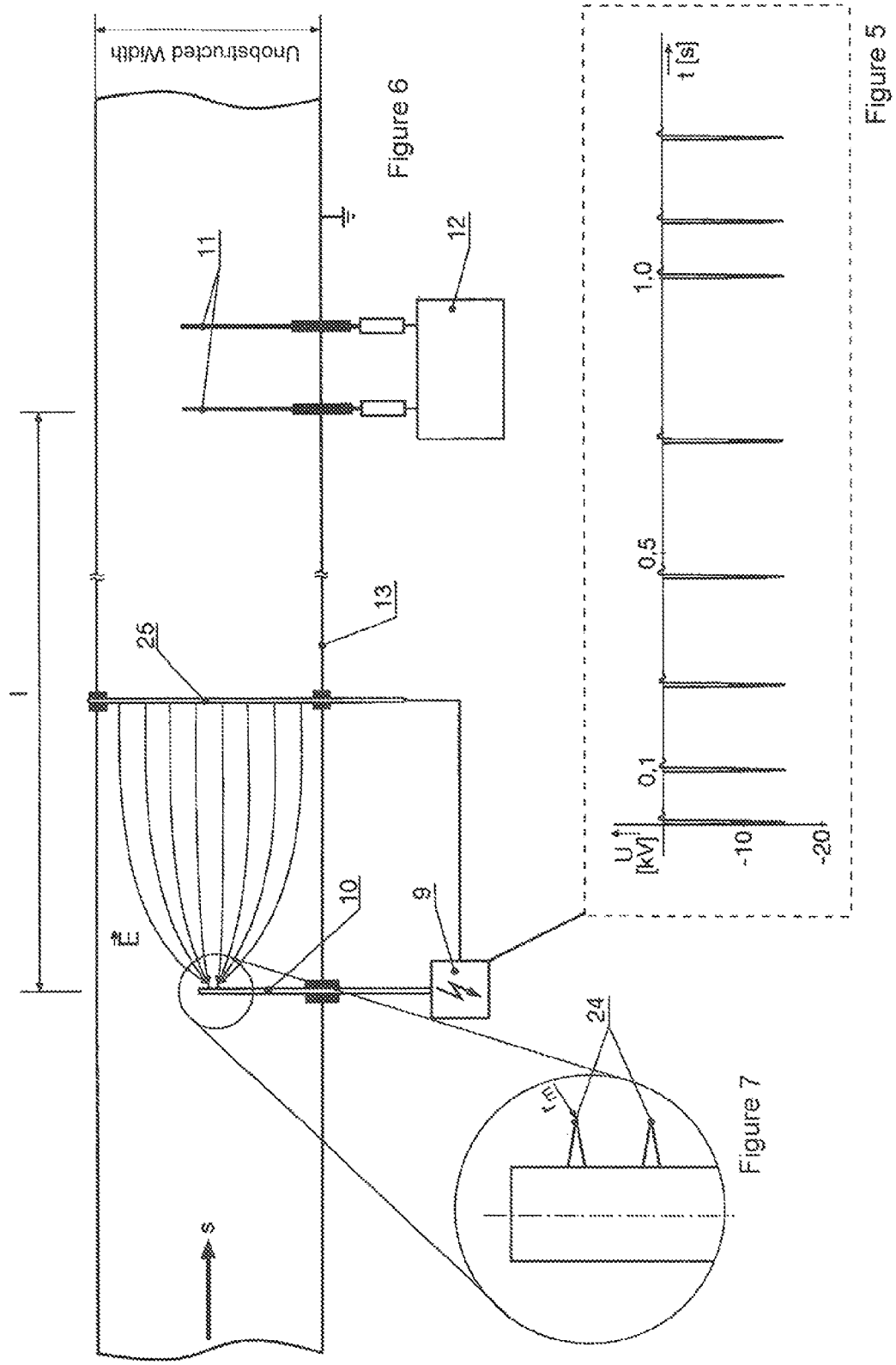

DEVICE AND METHOD FOR CONTROLLING THE FUEL-AIR RATIO IN THE COMBUSTION OF GROUND COAL IN A FIRING SYSTEM OF A COAL-FIRED POWER STATION

This is an application filed under 35 USC §371 of PCT/DE2012/000696, filed on Jul. 11, 2012, claiming priority to DE 10 2011 107 195.8 filed on Jul. 13, 2011.

BACKGROUND OF THE INVENTION (1) Field of the Invention

The invention concerns a device for controlling the fuel-air ratio in the combustion of ground coal in a firing system of a coal-fired power station, with means for pneumatic conveyance of the ground coal to the burners of the coal-fired power station as well as means for supplying combustion air to the burners and/or in the combustion chamber of the coal-fired power station, wherein the coal-fired power station has at least the following devices in the flow direction of the air:

A fresh air blower for drawing in fresh air from the environment, a mill fan for conveying a portion of the drawn-in fresh air as carrier air for loading with ground coal, an air pre-heater to preheating the drawn-in fresh air and a portion of the carrier air by using the flue gas heat of the coal-fired power station, an airflow control device for controlling the amount of combustion air introduced into the combustion chamber, an airflow control device for controlling the carrier air used for the pneumatic conveyance of the ground coal as well as measuring devices for measuring the amount of combustion air introduced into the combustion chamber of the coal-fired power station and a device for metered supply of a preselected quantity of ground coal to the burners.

The invention furthermore relates a method for controlling the air-fuel ratio in the combustion of ground coal in one coal-fired power station, which has at least one of the features listed above.

(2) Description of Related Art

The control of fuel air-ratio in the combustion of ground coal in coal-fired power stations is particularly important for achieving substantially complete combustion of the supplied fuel or for maintaining a predetermined stoichiometry of the combustion process and hence for achieving high energy efficiency as well as for maintaining lower emission values. Combustion systems in coal-fired power stations therefore have, in addition to suitable devices for metered supply of a preselected amount of fuel to the burners commensurate with the load demand, control devices configured to control the amount of air supplied to the burners or the combustion chamber depending on the supplied amount of fuel. For this purpose, measuring devices are required which are capable of measuring, preferably exactly, the amount air supplied to the combustion chamber, i.e. the amount of combustion air and the amount of carrier air. Both are necessary for optimally regulating the combustion process depending on the load, wherein the amount of fuel and hence also the amount of carrier air is preselected according to the load demand and the amount of combustion air is controlled to achieve a predetermined stoichiometry of the combustion.

In practice, coal-fired power stations exist where a preselected amount of ground coal is supplied to each individual burner or to a group of burners and the amount of air supplied to this burner or this group of burners is controlled according to the preselected amount to ground coal to achieve a predetermined stoichiometry of the combustion, as well as combustion systems where only the total amount of ground coal supplied to all burners is selected and accordingly also only the total amount of air supplied to all burners of this boiler or to this boiler is controlled.

In each case, it is necessary to measure the amount of air supplied to the boiler either in relation to an individual burner or to a group of burners or to all burners of a boiler or to the entire boiler in order to realize the appropriate control(s) of the amount of combustion air and to thereby regulate the combustion process.

Furthermore, in combustion power stations with pneumatic conveyance of the ground coal to the burners, the amount of carrier air for the pneumatic coal transport is controlled. This control also requires a measurement of the amount of carrier air.

The airflow in coal-fired power stations is predominantly measured with pressure sensors using a differential pressure measurement. For this purpose, pressure sensors are installed in the pipe or conduit system carrying the combustion air as well as in the pipe or conduit system carrying the carrier air. The flow velocity in the channels can be determined based on the measured pressures and the respective amount of air can be determined from the channel geometry. Preferably, the pressure sensors are not installed directly in the channel cross-section, but are connected with the channels carrying the air via so-called impulse lines.

To improve the energy efficiency of a coal-fired power station, it is common to preheat the fresh air. Frequently, regenerative air pre-heaters are employed. In regenerative air pre-heaters, a storage mass, usually smooth or corrugated metal sheets, is alternately first heated with hot flue gas and subsequently cooled with the fresh air, thereby transferring heat from flue gas to the fresh air. This is accompanied by the introduction of fly ash particles in the fresh air. This regularly causes contamination of the pressure sensors or of the impulse lines during operation of the coal-fired power station. Continuous cleaning and maintenance are then required. Disadvantageously, the degree the contamination of the pressure sensors cannot be clearly determined based the measured differential pressures so that the measurement results have a significant risk of error in continuing operation. This causes a drift in the air volume measurement which is detectable only at high costs. This leads ultimately to an inaccurate control of the air-fuel ratio, accompanied by a diminished efficiency and increased emission of pollutants.

Measuring devices are known in the art which evaluate triboelectric effects from sequentially arranged sensors in the flow direction of the particle-laden flowing medium. Such measuring devices enable not only the determination of the flow velocity of a particle-laden flowing medium, but also the determination of the loading of the flowing medium. For example, DE 69634249 T2 describes a measurement system that can be used to determine the speed of a volume flow composed of a gas and a powder, the ratio between the gas and the powder in the volume flow and the degree of turbulence in the flowing powder suspension by evaluating triboelectric effects at two sensor elements arranged in the volume flow. Such measurement system makes it possible to determine the amount of a pneumatically transported powdery solid in a powder-laden gas flow. The measurement system can be used, for example, to control the quantity of a powdery solid supplied to a process. A method for determining the amount of coal dust pneumatically transported in a pipeline to a burner is known from U.S. Pat. No. 4,512,200 A, wherein triboelectric effects of the coal dust particles are also evaluated at sensors sequentially arranged in the flow direction to determine the amount of pneumatically transported coal dust.

The aforementioned measuring systems and methods for determining the flow velocity and the loading of particle-laden flowing media by evaluating triboelectric effects at sensors sequentially arranged in the flow direction of the particle-laden media are in principle suitable to determine the amount of a particulate solid transported in the flowing medium. These systems and methods are also applied with high reliability and precision. However, they fail for the determination of the volume flow of a gas without particle loading transported in a pipeline system.

Therefore, a method for controlling of air-fuel ratio in the combustion of ground coal in a coal-fired power station is proposed in DE 10 2008 030 650 A1, which employs a regenerative air pre-heater for preheating the fresh air, wherein the quantity of combustion airflow and of the carrier air is measured based on the evaluation of triboelectric effects at sensors arranged sequentially in the airflow in the flow direction of the air by using the correlation method, wherein between 0.1 mg and 10 mg fine-grained particles per $m^3$ air are introduced in the airflow upstream of the sensors. Preferably, the fine-grained particles are introduced in the airflow only during the start-up phase of the coal-fired power station, i.e. only during the phase when ground coal is not burnt and therefore no fly ash particles are introduced in the fresh air by the regenerative air pre-heater. The expenditure for continuously supplying fine-grained particles during the entire operating time of a coal-fired power station is too high. The solution proposed in the DE 10 2008 030 650 A1 is hence only advantageous for a coal-fired power station with a regenerative air pre-heater for preheating the fresh air.

Moreover, it has been observed that the combustion air volume measurement and the carrier air volume measurement in a coal-fired power station based on the evaluation of triboelectric effects of triboelectrically charged particles carried in the airflow at sensors arranged sequentially in the flow direction of the air by using the correlation method can no longer be applied with sufficiently high measurement accuracy when the particle loading of the air and/or the flow velocity of the airflow fall below a critical value. The aforementioned critical values are at approximately a particle loading of 0.1 mg fly ash/$m^3$ air or a flow velocity of 10 m/s, wherein both values are interdependent for realizing a high measurement accuracy such that the particle loading the air can be smaller than the specified 0.1 mg fly ash/$m^3$ air, when the flow velocity the air is substantially greater than 10 m/sec and vice versa, and such that the flow velocity the air can also be less than 10 m/sec, while the particle loading of the air is greater than the aforementioned 0.1 mg fly ash/$m^3$ air.

BRIEF SUMMARY OE THE INVENTION

It is an object of the invention to provide a device and a method for controlling the fuel-air ratio during the combustion of ground coal in a coal-fired power station, wherein the above-mentioned disadvantages are eliminated. In particular, the combustion air volume measurement and the carrier air volume measurement in a coal-fired power station based on the evaluation of signals from sensors arranged sequentially in the flow direction of the air by using the correlation method should be improved, so that they can also be applied in coal-fired power stations or with an operating mode of a coal-fired power station that do not have any loading or only an extreme low loading of the air with particles and/or where the flow velocity of the air is low.

According to the invention, the object is attained with a device according to claim 1 and a method according to the claim 9. Advantageous embodiments of the inventive device are described in claims 2 to 8 that depend from claim 1, and advantageous embodiments of the inventive method are described in claims 9 to 16 that depend from claim 9.

A device according to the invention for controlling of air-fuel ratio in the combustion of ground coal in a coal-fired power station has means for pneumatic conveyance of the ground coal to the burners of the coal-fired power station as well as means for supplying the combustion air to the burners or into the combustion chamber of the coal-fired power station, wherein at least the following devices are arranged in the flow direction of the air:

a fresh air fan for drawing in fresh air from the environment, a mill fan for conveying a portion of the drawn-in fresh air as carrier air to a coal mill, an air pre-heater for preheating the drawn-in fresh air and a portion of the carrier air by using the flue gas heat the coal-fired power station, an airflow controller for controlling the in the combustion chamber initiated amount of combustion air, a airflow control device for controlling the carrier air to be used for the pneumatic conveyance of the ground coal and measuring devices for measuring the amount of combustion air introduced in the combustion chamber and the amount of carrier air to be used for pneumatic conveyance of the ground coal, and a device for metered supply of a preselected amount of ground coal to the burners, wherein the air volume is measured by a correlation measurement device that evaluates signals generated through electrostatic induction by at least two sensors arranged sequentially in the flow cross-section of the air conducting channel in the flow direction of the air, is characterized in that an electrode with an electrode contour having an average radius $r_m$ with 0.1 mm<$r_m$<1.2 mm is arranged in the flow cross-section of the channel carrying the air in the flow direction upstream of the sensors at a distance l with 1× unobstructed width of flow cross-section of the channel carrying the air<l<10× unobstructed width of flow cross-section of the channel carrying the air in the area the sensors, preferably 3× unobstructed width of the flow cross-section of the channel carrying the air<l<5× unobstructed width of the flow cross-section of the channel carrying the air in the area the sensors, wherein the distance l is the distance between the electrode and the first sensor the two sequentially arranged sensors in the flow direction (s) of the air, that the counter electrode in electric opposition to this electrode is arranged at least in sections in the flow direction of the air upstream of the sensors and that the electrode as well as the counter electrode are connected with the different poles of a high-voltage source having a voltage U of 12 kV≤U≤20 kV, preferred 15 kV≤U≤17 kV.

The amount of combustion air supplied to the boilers and the amount of carrier air required for the pneumatic conveyance of the ground coal are measured with the correlation measuring device which evaluates the signals generated due to the electrostatic induction by the sensors arranged sequentially in the flow cross-section of the air conducting channel in the flow direction of the air. For this purpose, corresponding sensors are arranged in the channel system carrying the combustion air and in the channel system carrying the carrier air, which are electrically connected with correlation measurement devices.

Preferably, the electrode arranged in the channel carrying the air at the distance l upstream of the sensors and connected to a high-voltage source may have one or several tips or blades with a contour having an average radius $r_m$ with 0.1 mm≤$r_m$≤12 mm or may be constructed as a wire having an average radius $r_m$ with 0.1 mm≤$r_m$≤1.2 mm. The described electrode is particularly preferred constructed as a rod protruding into the flow cross-section, wherein the end the electrode protruding into the flow cross-section projects approximately to center of the flow cross-section and has at least a tip or blade with an average radius $r_m$ with 0.1 mm≤$r_m$≤1.2 mm.

If the channel wall of the channel carrying the air is designed to be electrically conductive, then the channel wall can in a preferred embodiment of the invention be electrically connected as counter electrode to the electrode arranged in the flow cross-section of the channel carrying the air.

In another embodiment of the invention, the counter electrode is designed as an electric conductive rod or wire which spans at least half the channel cross-section and is arranged in the flow direction of the air downstream of the electrode and upstream of the sensors, i.e. in the flow direction of the air between the electrode and the sensors. Of course, several rods or wires may also be arranged between the electrode and the sensors in the flow direction of the air and as counter electrode.

Preferably, is however, a rod or wire completely spanning the channel cross-section is arranged in the flow direction of the air between the electrode and the sensors and is electrically connected as counter electrode.

The electrode is preferably arranged insulated with respect to the channel wall of the channel carrying the air. The electrode may have one or several tips or blades with a contour having an average radius $r_m$ with 0.1 mm≤$r_m$≤1.2 mm or be constructed as a wire having an average radius $r_m$ with 0.1 mm≤$r_m$≤1.2 mm. The electrode is preferably electrically connected as a cathode. The counter electrode is preferably electrically connected to ground potential, which is particularly advantageous when the channel wall is electrically conductive and acts as counter electrode.

The sensors may be electrically insulated with respect to the air carried in the channel to prevent interferences caused by a direct charge exchange between the sensors and ionized air molecules.

A correlation measurement device may be provided for evaluating signals generated by sensors by electrostatic induction arranged in the flow cross-section of the channel carrying the air sequentially in the flow direction of the air, wherein the sensors are arranged downstream of an electrode arranged in the flow cross-section of the channel carrying the air and electrically connected to a high-voltage source with a voltage U of 12 kV≤U≤20 kV, preferably 15 kV≤U≤17 kV. Several of the aforementioned correlation measurement devices may also be arranged in different branches of the channel carrying the air system, when the electrode connected with a high-voltage source having a voltage U of 12 kV≤U≤20 kV, preferably 15 kV≤U≤17 kV, is arranged in the flow cross-section of the channel carrying the air upstream of the branching in the flow direction. It is important that the measured distance l of the sensors to the electrode along the airflow is <10× the unobstructed width of the flow cross-section of the channel carrying the air in the area of the sensors.

The method according to the invention is based on an air volume measurement, namely a measurement of the combustion air volume and a measurement of the carrier air volume, based on the evaluation of electrical signals generated through electrostatic induction on at least two sensors arranged sequentially in the flow cross-section of the channel carrying the air in the flow direction of the air by using the correlation method. The method is characterized in that in the flow direction of the air upstream of the sensors, at least a portion of the airflow is exposed to the effect of an electrode having an electrode contour with an average radius $r_m$ with 0.1 mm≤$r_m$≤1.2 mm and carrying a voltage U of 12 kV≤U≤20 kV, preferably 15 kV≤U≤17 kV, whereby the airflow is ionized; conversely, the sensors are not exposed to the effect of the ion current driven by the voltage U and flowing between the electrode and the counter electrode.

Preferably, a negative voltage is applied to the electrode which is thus connected as a cathode.

The ionized air molecules flowing as an ion current in the electric field $\overline{E}$ from the electrode to the counter electrode interact with other molecules of the airflow, whereby the molecules of the airflow are electrically influenced so that when the airflow flows past the sensors, electrical signals are generated in the sensors by the electrically influenced molecules of the airflow through electrostatic induction, which can be reliably evaluated by using a correlation measurement device.

It is of particular importance that the sensors are not directly exposed to the effect from the ion current flowing between the electrode and the counter electrode. The sensors are positioned at such a distance in relation to the electrode that the effect of the electrical field $\overline{E}$ produced between the electrode and the counter electrode is insignificant, i.e. the electric field strengths are <0.3 V/m.

The airflow can be exposed to the effect of a constant negative voltage U at the electrode or also to a time-variable voltage U with maximum values between 12 kV≤U≤20 kV, preferably 15 kV≤U≤17 kV. Particularly advantageous is the effect of a pulsed voltage U with maximum values between 12 kV≤U≤20 kV, preferably 15 kV≤U≤17 kV, and a pulse duration of approximately 1 ms.

It has been observed that for a variable voltage U, in particular a pulsed voltage U, the correlation measurement can not only be performed based on the evaluation of stochastic signatures of the electrical signals generated by the electrostatic induction at the sensors; in addition, the time variation of the electrical voltage U and hence the time variation of the effect of this voltage U on the molecules of the airflow can be evaluated to determine the flow velocity of the air and thus for measuring the air volume.

In a particularly preferred embodiment of the method, the airflow is exposed to a periodically recurrent pulse sequence with a number of n pulses having a voltage U with maximum values between 12 kV≤U≤20 kV, preferably 15 kV≤U≤17 kV, and a pulse duration of approximately 1 ms, wherein 2≤n≤10 and wherein the pulse sequence of n pulses is repeated periodically with a period duration between 0.2 s and 3.0 s, preferably between 1.0 s and 1.5 s.

In a particularly advantageous embodiment of the method with a pulsed voltage applied between the electrode and the counter electrode, the signals generated by the electrostatic induction are evaluated by using the correlation measurement method, wherein the evaluation has a time-offset with respect to the pulses of the voltage U applied to the electrode. Preferably with a time offset between 5 ms and 150 ms, particularly preferred with a time offset between 8 ms and 70 ms. In this way, signals generated at the sensors by rapidly changing electromagnetic fields caused by the voltage pulses—interference signals—are not taken into account in the evaluation the signals generated by the airflow at the sensors through electrostatic induction.

With the invention method of the invention, very exact air volume measurements can be performed even with comparatively small flow velocities of the air between 2 m/sec and 10 m/s.

When the coal-fired power station has a regenerative air pre-heater, a voltage U needs to be applied to the electrode only when ground coal is not introduced into the carrier air and hence no fly ash particles are not introduced into the fresh air via the regenerative air pre-heater, or when the flow velocity of the air in the region of the sensors is comparatively small. In this case, the air volume cannot be measured while ground coal is burnt in the coal-fired power station and at a high flow velocity the air in the region of the sensors by using the correlation measurement method and evaluating the signatures of the signals produced by triboelectric effects on the electrical charge carriers generated by the fly ash particles introduced into the airflow. Only when no fly ash particles or only very few fly ash particles are present in the airflow and/or when the flow velocity of the air is less than 10 m/sec is it necessary that a voltage U is applied to the electrode, as described above.

It may be advantageous in the above-described case when a voltage U is applied to the electrode only from time to time, as described above, so that the obtained results of the air volume measurement can be used to check with the correlation measurement method the air volume measurements obtained by evaluating the signatures of the signals produced by triboelectric effects on the electrical charge carriers generated by the fly ash particles introduced into the airflow.

The invention has the particular advantage that the velocity of the air is measured directly according to the correlation measurement method, because the signals at the sensors are generated directly by the molecules of the airflow through electrostatic effects, whereas with comparable methods of the prior art, signatures of signals generated by particles carried in the airflow, namely fly ash particles, are evaluated according to the correlation measurement method. It will be understood that the velocity of the particles may have slippage relative to the flow velocity of the airflow carrying the particle, which falsifies the measurement results. The aforementioned slippage can be the greater the smaller the flow velocity of the airflow is and the greater the particles are.

The device according to the invention and the method according to the invention enable a trouble-free and maintenance-free control of the fuel-air ratio in a coal-fired power station and hence of the combustion process with high reliability, precision and long-term stability of the accuracy of the air volume measurement.

BRIEF DESCRIPTION OF THE DRAWINGS

The invention will now be described in more detail based an exemplary embodiment. The associated drawings show in:

FIG. 1: a simplified block diagram one coal-fired power station, in

FIG. 2: the arrangement of an electrode connected to a high-voltage source and sensors connected to a correlation measurement device in a channel carrying combustion air, in FIG. 3: the formation of an electrode tip of an electrode connected to a high-voltage source, in FIG. 4: time profiles of the high voltage connected to the electrode, in FIG. 5: another time profile of the high voltage connected to the electrode, in FIG. 6: another arrangement of an electrode connected to a high-voltage source, with a corresponding rod-shaped counter electrode, and sensors connected to a correlation measurement device in a channel carrying combustion air, in FIG. 7: another embodiment of the electrode tip with an electrode connected to a high-voltage source, in FIG. 8: the arrangement of an electrode connected to a high-voltage source and sensors of two correlation measurement devices downstream of a branching of the channel carrying the combustion air, and in FIG. 9: the time profile of an air volume measurement in a coal-fired power station.

DETAILED DESCRIPTION OF THE INVENTION

Figure 1:
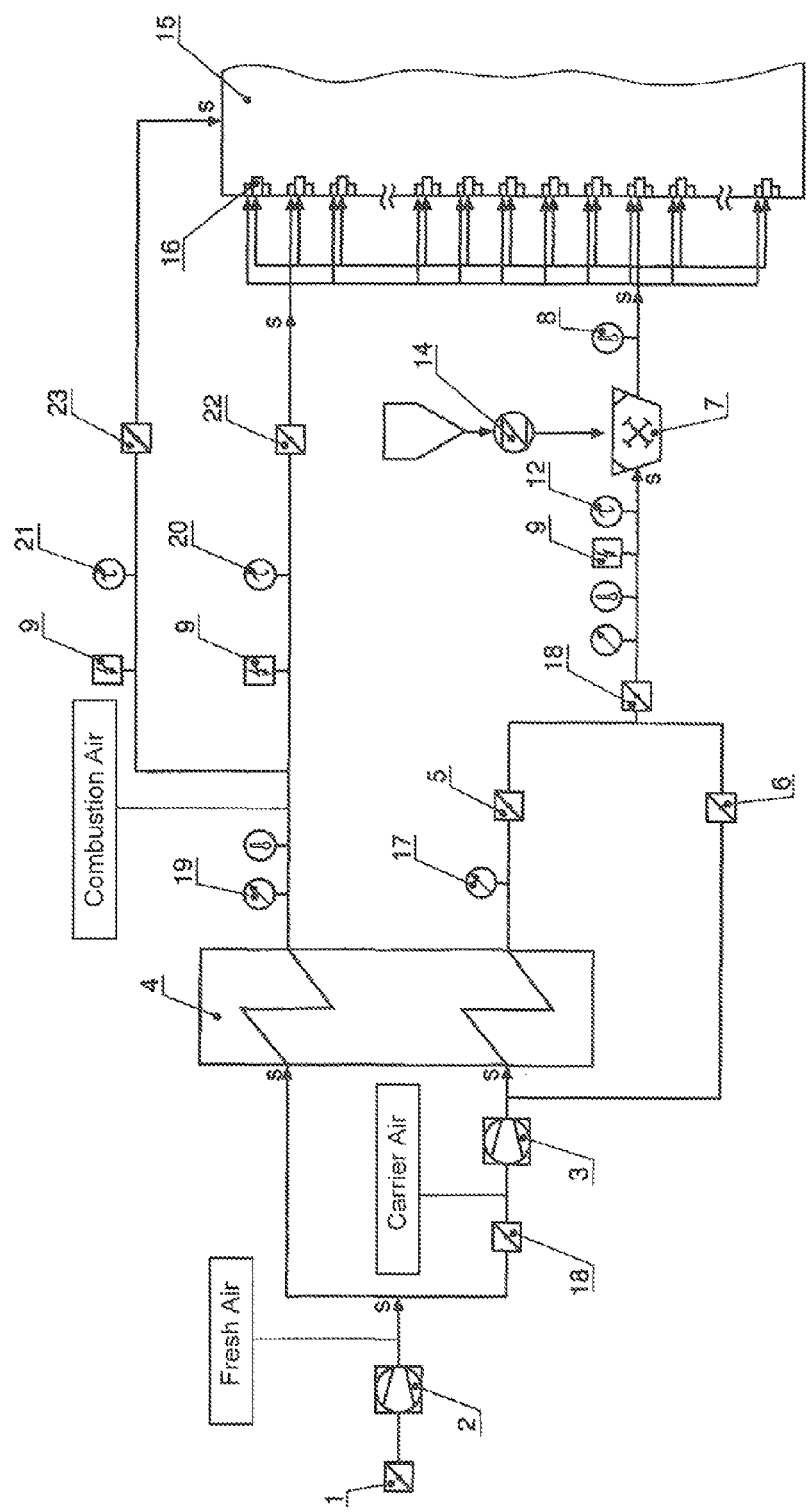

The simplified block diagram of a coal-fired power station shown in FIG. 1 shows, starting with drawing-in of the fresh air, a fresh air damper 1 in the flow direction s of the air followed of a fresh air fan 2. The carrier air is diverted from the drawn-in air downstream of the fresh air fan 2. The carrier air is transported onward by a mill fan 3, and in part to a regenerative air pre-heater 4. A portion of the carrier air is heated in the regenerative air pre-heater 4 during the stationary operation the coal-fired power station. Another portion of the carrier air is transported onward while cold. Both portions of the carrier air are combined metered via the hot air flap 5 and the cold air flap 6 in such proportions, that the temperature of carrier air-coal mixture after loading with finely ground coal lies within predetermined limit values. The temperature of the carrier air is measured with a temperature measuring device 8 arranged downstream of the coal mill 7. Upstream of the coal mill 7, an electrode 10 connected to a high-voltage source 9 is arranged in the flow cross-section of the channel conveying the carrier air, whereas two sensors 11 connected to a carrier air volume measuring device 12 are arranged downstream in the flow direction s of the carrier air. These sensors 11 are constructed as rods protruding into the carrier airflow which are arranged in pairs in the flow direction s of the carrier air.

The carrier air volume measuring device 12 is constructed as a correlation measurement device which evaluates the signals generated at the sensors 11 by the passing electrically charged particles due to electrostatic induction and thereby measures the flow velocity of the carrier air. The amount of carrier air is determined based on the cross-sectional area of the channel carrying the carrier air in the region of the arranged sensors 11 and the temperature of the carrier air and the static pressure of the carrier air in the region of the arranged sensors 11. The sensors 11 are arranged in the flow direction s of the carrier air at a distance l to the electrode 10, wherein l≈4× unobstructed width of the flow cross-section of the channel in the region of the sensors 11. The wall 13 of the channel carrying, the carrier air is electrically conductive and connected to ground potential. The electrode 10 and the sensors 11 are electrically insulated with respect to the wall 13 of the channel. Metered quantities of coal are supplied by a metering device 14 to the coal mill 7 commensurate with load demand from the coal-fired power station. The carrier air loaded with ground coal is supplied to burners 16 arranged in a combustion chamber 15. Depending on the design of the coal-fired power station, this may occur in relation to a single burner or groups of burners or common to all burners 16 of a combustion chamber 15. A pressure measuring device 17 measuring the static pressure of the carrier air is arranged downstream of the regenerative air pre-heater 4 in the flow direction s of the carrier air. Furthermore, safety valves 18, which are closed during the start-up phase of the coal-fired power station, i.e. when no ground coal is supplied to the burners 16, are arranged in the carrier airflow.

The bulk of the drawn-in fresh air is supplied as combustion air to the regenerative air pre-heater 4 located downstream of the fresh air fan 2. The static pressure of the heated combustion air is measured with a static pressure measuring device 19. The fresh air fan 2 is controlled by the pressure measuring devices 17 and 19. A portion of the heated combustion air is supplied directly to the burners 16, whereas another portion of the heated combustion air is supplied to the combustion chamber 15. Both portions of the combustion air are measured with the combustion air volume measurement devices 20 and 21. For this purpose, sensors 11 which are each connected with the combustion air measurement devices 20 and 21 are arranged in the respective channels carrying the combustion air. A corresponding electrode 10 connected to a high-voltage source 9 is arranged in each of the channels carrying the combustion air upstream of the sensors 11' of the combustion air volume measurement devices 20 and 21. The sensors 11 are, like for the carrier air volume measurement, arranged in the flow direction s of the combustion air at a distance l to the electrode 10, wherein l≈20× unobstructed width of flow cross-section of the channel in the region of the sensors 11.

The combustion air volume measurement devices 20 and 21 are, like the carrier air volume measuring device 12, constructed as a correlation measurement device which evaluates the signals generated through electrostatic induction by the electrically charged particles flowing past the sensors 11 and hence measure the flow velocity of the combustion air. The amount of combustion air is determined by taking into account the cross-sectional area of the channel carrying the combustion air and the temperature of the combustion air and the static pressure of the combustion air in the region of the arranged sensors 11.

The amount of combustion air supplied to the burners 16 and to the combustion chamber 15 for achieving the air-fuel ratio required for a predetermined stoichiometry for the combustion for an amount of ground coal supplied to the burners 16 commensurate with the load demand from the coal-fired power station is controlled with the combustion air control flaps 22 and 23.

Depending on the size or the performance of the coal-fired power station, all aforementioned assemblies and devices may be present multiple times and may operate in parallel. For sake of clarity of the simplified block diagram, the assemblies and devices are each shown only once. The operating principle of the coal-fired power station remains unaffected, as far as the invention is concerned.

FIG. 2 shows the arrangement of an electrode 10 connected to a high-voltage source 9 as well as of two sensors 11 arranged in a flow cross-section of a channel carrying combustion air and connected to a correlation measurement device 12. For measuring the carrier air volume, the electrode 10 and the sensors 11 are similarly arranged in the flow cross-section of the channel carrying the carrier air.

The electrode 10 is electrically insulated with respect to the electrically conductive wall 13 of the channel carrying the combustion air which is connected to ground potential and operates as a counter electrode to the electrode 10. The electrode 10 is constructed as a round metallic rod that protrudes into the channel approximately to the center of flow cross-section and has a rod diameter of approximately 12 mm. Metallic tips 24 having an average radius $r_m$=0.4 mm of the tip 24 are arranged at the end the electrode 10 and located approximately at the center of flow cross-section, as shown in FIG. 3. The tips 24 are made from a sheet steel having a thickness of 1 mm and inserted in a slot machined in the round bar and electrically conductively connected with the round bar. The electrode is electrically connected to a high-voltage source 9 and connected as a cathode with respect to the wall 13 of the channel acting as the counter electrode. The electrical field $\vec{E}$ between the two electrodes will have the illustrated profile with this arrangement and design of the electrode 10 and the channel wall 13 acting as the counter electrode Two sensors 11 are sequentially arranged in relation to the electrode 10 in the flow direction s of the combustion air at a distance l=4× unobstructed width of the channel cross-section. The sensors 11 are constructed as measuring rods protruding into the flow cross-section approximately to the center of the flow cross-section. The distance l refers to the distance between the electrode 10 and the first sensor 11 of the two sequentially arranged sensors in the flow direction s of the air. The two sensors 11 are arranged in the flow direction s of the air at a distance of approximately 350 mm from each other. The mutual distance between the sensors 11 in the flow direction s of the air may be between 200 mm to 1000 mm.

It is important that the sensors 11 are positioned at a distance from the electrode 10, where the effect of the electric field $\vec{E}$ formed between the electrode 10 and the channel wall 13 acting as counter electrode is still insignificant, i.e. the electrical field strength is <0.3 V/m.

The sensors 11 are also electrically insulated with respect to the wall 13 of the channel carrying the combustion air which is electrically connected to ground potential and operates as a counter electrode. The sensors 11 are electrically connected with a correlation measurement device 12.

FIGS. 4 and 5 show possible exemplary time profiles of the voltage U provided by the high-voltage source 9. These are illustrated in FIG. 4 as a DC voltage of approximately −16 kV, a variable voltage with peak values of approximately −16 kV or a pulsed voltage with voltage pulses having a pulse duration of approximately 1 ms and a repetition rate of approximately 300 ms, whereas in FIG. 5 shows a periodically recurring sequence of 5 pulses having a voltage U with peak values of approximately −16 kV and a pulse duration of approximately 1 ms and a period of the sequence of voltage pulses of 1.0 s. The spacing between the 5 pulses is hereby not constant within the sequence, but initially increases from 0.1 s between the first and the second voltage pulse, 0.15 s between the second and the third voltage pulse, 0.2 s between the third and the fourth voltage pulse, to finally 0.25 s between the fourth and the fifth voltage pulse.

It has been observed that such periodically recurrent sequences of voltage pulses can produce particularly good measurement results.

FIG. 6 shows another arrangement of an electrode 10, a rod-shaped counter electrode 25 electrically cooperating with this electrode 10, and two sensors 11 connected with a correlation measurement device 12 and arranged in the flow cross-section of a channel carrying combustion air. The counter electrode 25 is constructed and arranged to extend completely through the flow cross-section of a channel carrying combustion air. The counter electrode 25 is arranged in the flow direction s of the combustion air between the electrode 10 and the sensors 11, or more precisely between the electrode 10 and the first sensor 11 of the two sensors in the flow direction s of the combustion air and opposite the wall 13 of the electrically insulated channel conducting the combustion air. The electrode 10 and the counter electrode 25 are electrically connected to the two poles of the high-voltage source 9. When a voltage or a voltage pulse is applied, an electric field is formed between the electrode 10 and the counter electrode 25, as shown in FIG. 6. The sensors 11 are positioned at such distance from electrode 10 that the effect of the electric field $\vec{E}$ formed between the electrode 10 and the counter electrode 25 is rather insignificant, i.e. the electrical field strength is <0.3 V/m.

FIG. 7 shows the structure of the end of the electrode 10 located approximately at the center of the flow cross-section. Tips 24 oriented toward the counter electrode 25 are formed at the aforementioned end of the electrode 10

Figure 8:
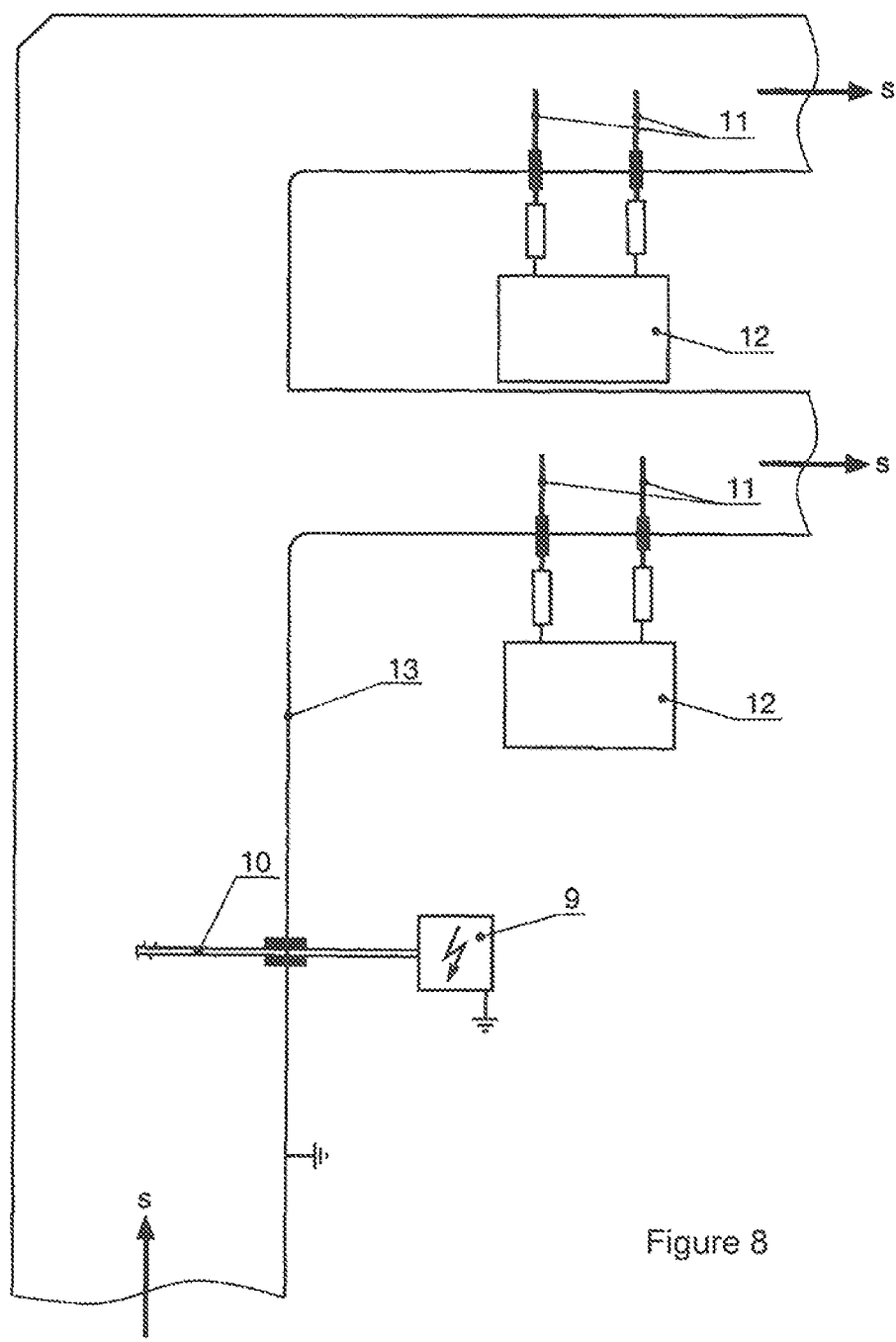

FIG. 8 shows the arrangement of an electrode 10 connected to a high-voltage source 9 as well as sensor groups, each composed of two sensors 11, which are each electrically connected with a respective correlation measurement device 12.1 and 12.2, downstream of a branching of the channel carrying the combustion air. The features of the arrangement of the electrode 10 and the sensors 11 described in FIGS. 2 and 6, respectively, apply similarly, however with the difference that the channel carrying the combustion air branches off downstream of the electrode 10 in the flow direction s of the combustion air and that in each channel branch a respective group having each two sensors 11 is arranged that is connected with a respective one of the correlation measurement devices 12.1 or 12.2. In the flow direction s the combustion air, the distance I between the electrode 10 and the sensors 11 that are electrically connected with the correlation measurement device 12.1 is l≈4× unobstructed width of the channel cross-section in the region of the sensors 11, and is for the sensors 11 that are electrically connected with the correlation measurement device 12.2 l≈8× unobstructed width of the channel cross-section in the region of the sensors 11.

Figure 9:
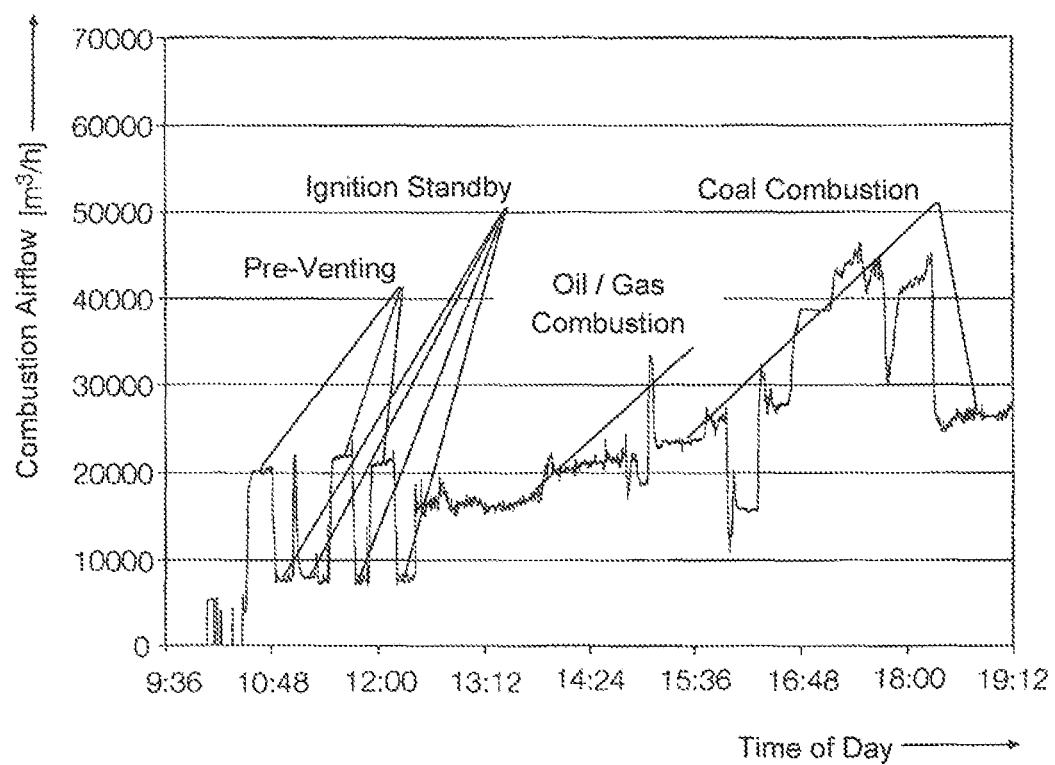

FIG. 9 shows the time profile of the amount of combustion air supplied to a burner 16 or to a group of burners 16 during the start-up phase of a coal-fired power station.

First, the combustion chamber 15 is pre-purged. The combustion air control flaps 22 and 23 are fully open whereas the safety flaps 18 in the carrier air guide are closed. Combustion air is supplied exclusively to the combustion chamber 15. The fresh air fan 2 is controlled as a function of the pressure of the combustion air measured with the static pressure measuring device 19. Initially, as much combustion air is blown into the combustion chamber 15 so as to produce a multiple exchange (at least 3-fold) of the amount of air in the combustion chamber 15 in order to remove residual fuel from the combustion chamber 15 to prevent deflagration. After the amount of air in the combustion chamber 15 has been exchanged multiple times, the ignition standby for oil-or gas burners not illustrated in FIG. 1) arranged in the combustion chamber 15 is established. When ignition standby is established, the amount of combustion air is controlled as a function the amount of fuel (oil or gas) supplied to the ignition process. The high-voltage sources 9 generate sequences of high-voltage pulses applied to the electrodes 10, wherein the electrodes 10 are electrically connected as cathodes in relation to the walls 13 of the channels carrying the combustion air and operating as counter electrode. The high-voltage pulses have a pulse width of 1 ms, and maximum values of the voltage U of U =−16 kV. The amount of combustion air is measured with the combustion air volume measurement devices 20 and 21 and the amount of combustion air supplied to the burners 16 or to the combustion chamber 15 is controlled by the combustion air control flaps 22 and 23. The oil-firing or gas-firing of the coal-fired power station is continued as long as sufficient preheating of the combustion chamber 15 and of the regenerative air pre-heater 4 is achieved. During the oil-firing or gas firing, high- voltage pulses are applied to the electrodes 10 for producing clouds of ionized air molecules in the combustion airflow. These clouds of ionized air molecules are conducted to the counter electrode in the electrical field $\vec{E}$ formed between the electrode 10 and the counter electrode as ion current. This produces an interaction between the aforementioned ionized air molecules and other molecules of the combustion airflow. As a result this interaction, the molecules of the combustion airflow are electrically influenced so that signals are venerated when the molecules flow past the sensors 11 due to electrostatic induction, from which the respective flow velocity of the combustion air can be determined by evaluation with the correlation measurement method. The amount of combustion air is then calculated based on the flow velocity of the combustion air by taking into account the cross-sectional area of the channel carrying the combustion air as well as the temperature of the combustion air and the static pressure of the combustion air in the respective region of the arranged sensors 11. It is important that the sensors 11 are not exposed to the direct effect of the ion current between the electrode 10 and the counter electrode 13, 25, because signals generated at the sensors 11 as a result of the ion current transported by the electric field $\vec{E}$ cannot be evaluated with the correlation measurement method in the same way as the signals generated by the sensors 11 which are generated, as will be described below, by particles flowing past the sensors that are electrically charged by triboelectric effects as a result electrostatic induction.

When the combustion chamber 15 is sufficiently preheated, ground coal begins to enter the combustion chamber 15. For this purpose, the carrier airflow is started via the mill fan 3 and by opening the safety flaps 18, and the coal mill 7 is supplied with a metered amount of coal. The carrier air is loaded with ground coal. The ground coal is ignited at the still operating oil burners or gas burners.

Beginning with the introduction of coal in the combustion chamber 15 and ignition of the coal combustion, application of high-voltage pulses to the electrodes 10 can end, because a sufficient amount of ash particles are introduced into the combustion air and the carrier air via the regenerative air pre-heater 4, which are electrically charged by triboelectric effects and produce signals when flowing past the sensors 11 due to electrostatic induction which can be evaluated with the correlation measurement method. Nevertheless, high-voltage pulses can be applied to the electrodes 10 at an interval of approximately 30 minutes, if necessary also at shorter intervals, in order to perform measurements to test the measurement accuracy of the device based on signals produced by the ash particles charged by triboelectric effects and flowing past the sensors 11 as well as by ionized air molecules through electrostatic induction. This allows a substantially more accurate measurement of the flow velocity of the combustion air or the carrier air, resulting in a substantially more accurate measurement of the volume of combustion air and the volume of carrier air, so that the air-fuel ratio in the combustion of ground coal in a coal-fired power station can be much more precisely controlled.

However, when the flow velocity of the combustion air or of the carrier air drops below a value of 10 m/s, corresponding high voltage pulses should be applied to the electrodes 10, because the measurement accuracy of the combustion air volume measurement or of the carrier air volume measurement according to the correlation measurement method by evaluating the signals generated at the sensors 11 exclusively by particles electrically charged by triboelectric effects deteriorates substantially.

LIST THE REFERENCE SYMBOLS 1 fresh air damper
2 fresh air fan
3 mill fan
4 regenerative air pre-heater
5 Hot air flap
6 Cold air flap
7 coal mill
8 Temperature measuring device
9 high-voltage source
10 electrode
11 sensor
12 correlation measurement device
12.1 correlation measurement device
12.2 correlation measurement device
13 Wall of the channel
14 metering device
15 combustion chamber
16 burner
17 pressure measuring device for measuring the static pressure of the carrier air
18 Safety flap in the carrier airflow
19 pressure measuring device for measuring the static pressure of the combustion air
20 combustion air quantity measuring device
21 combustion air quantity measuring device
22 combustion air control flap
23 combustion air control flap
24 tip of or on the electrode 10
25 counter electrode
E Electric field
l distance
n Number of pulses of a voltage U
$r_m$ average radius of the tip
s flow direction
U voltage

The invention claimed is:

1. A method for operating a coal-fired power station with a device for controlling the air-fuel ratio in the combustion of ground coal, which the coal-fired power station comprising pneumatic conveyance of the ground coal to burners (16) of the coal-fired power station as well as a combustion air supply for conveying combustion air to the burners (16) or into a combustion chamber (15) of the coal-fired power station providing the steps of:

providing a combustion air volume measurement and a carrier air volume measurement which are performed based on evaluation of signals generated by sensors (11) arranged sequentially in a flow direction (s) of the air in a flow cross-section of a channel carrying the air with a correlation measurement method, providing at least a portion of the airflow in the flow cross-section of the channel carrying the air upstream of the sensors which is exposed to an effect of an electrode (10), arranged in the flow direction (s) of the air upstream of the sensors (11) at a distance l with 1× unobstructed width of the flow cross-section of the channel carrying the air<l<10× unobstructed width of the flow cross-section of the channel carrying the air in a region of the sensors (11), wherein the electrode (10) carries a voltage U of 12 kV≤U≤20 kV, and has an electrode contour with an average radius $r_m$ with 0.1 mm≤$r_m$≤1.2 mm, whereby a portion of the airflow is ionized, and wherein the sensors (11) are not exposed to a direct effect of ion flow driven by the voltage U and flowing between the electrode (10) and a counter electrode (13, 25).

2. The method according to claim 1, wherein the electrode (10) carries a constant negative voltage U.

3. The method according to claim 1, wherein the electrode (10) carries a time-varying voltage U with maximum values between 12 kV≤U≤20 kV.

4. The method according to claim 1, wherein the electrode (10) carries a pulsed voltage U with maximum values between 12 kV≤U≤20 kV, and a pulse duration of approximately 1 ms.

5. The method according to claim 4, wherein the evaluation of the signals generated by electrostatic induction at the sensors (11) arranged sequentially in the flow direction of the air in the flow cross-section of the channel carrying the air is performed with the correlation measurement method with a time offset relative to the pulses with the voltage U carried by the electrode (10).

6. The method according to claim 4, wherein the time offset between the pulses with the voltage U and the evaluation of the signals generated at the sensors (11) by electrostatic induction according to the correlation measurement method is between 5 ms to 150 ms.

7. The method according to claim 4, wherein the time offset between the pulses with the voltage U and the evaluation of the signals generated at the sensors (11) by electrostatic induction according to the correlation measurement method is between 8 ms to 70 ms.

8. The method according to claim 1, wherein the electrode (10) periodically carries a number of n pulses having a voltage U with maximum values between 12 kV≤U≤20 kV, wherein 2≤n≤10 and a pulse duration of approximately 1 ms, and wherein a period duration of the n pulses is between 1.0 s to 1.5 s.

9. The method according to claim 1, wherein upon the coal-fired power station comprises a regenerative air pre-heater (4), the electrode (10) carries a voltage only when no ground coal is introduced into the carrier air and hence no fly ash particles are introduced into the fresh air via the regenerative air pre-heater (4), or when the flow velocity of the combustion air or of the carrier air drops below a value of 10 m/sec or when the control of the fuel air-ratio is to be checked during of normal power plant operation.

10. The method according to claim 1, wherein the step of providing at least a portion of the airflow in the flow cross-section of the channel carrying the air upstream of the sensors which is exposed to the effect of an electrode (10), arranged in the flow direction (s) of the air upstream of the sensors (11) at a distance l with 1× unobstructed width of the flow cross-section of the channel carrying the air<l<10× unobstructed width of the flow cross-section of the channel carrying the air in the region of the sensors (11), wherein the electrode (10) carries a voltage U of 15 kV≤U≤17 kV, and has an electrode contour with an average radius $r_m$ with 0.1 mm≤$r_m$≤1.2 mm, whereby the portion of the airflow is ionized, and wherein the sensors (11) are not exposed to the direct effect of the ion flow driven by the voltage U and flowing between the electrode (10) and the counter electrode (13, 25).

11. The method according to claim 10, wherein the distance l with 3× unobstructed width of the flow cross-section of the channel carrying the air<l<5× unobstructed width of the flow cross-section of the channel carrying the air in the region of the sensors (11).

12. The method according to claim 1, wherein the electrode (10) carries a time-varying voltage U with maximum values between 15 kV≤U≤17 kV.

13. The method according to claim 1, wherein the electrode (10) carries a pulsed voltage U with maximum values between 15 kV≤U≤17 kV, and a pulse duration of approximately 1 ms.

14. The method according to claim 1, wherein the electrode (10) periodically carries a number of n pulses having a voltage U with maximum values between 15 kV≤U≤17 kV, wherein 2≤n≤10 and a pulse duration of approximately 1 ms, and that the period duration of the n pulses is between 1.0 s to 1.5 s.

* * * * *